United States Patent [19]

Itoh et al.

[11] Patent Number: 4,825,116
[45] Date of Patent: Apr. 25, 1989

[54] TRANSMITTER-RECEIVER OF ULTRASONIC DISTANCE MEASURING DEVICE

[75] Inventors: Ichizo Itoh; Hiroshi Owada; Toru Fujii, all of Tokyo, Japan

[73] Assignee: Yokogawa Electric Corporation, Tokyo, Japan

[21] Appl. No.: 171,963

[22] Filed: Mar. 23, 1988

[30] Foreign Application Priority Data

| May 7, 1987 | [JP] | Japan | 62-111492 |
| Aug. 11, 1987 | [JP] | Japan | 62-200424 |
| Aug. 31, 1987 | [JP] | Japan | 62-216999 |
| Sep. 8, 1987 | [JP] | Japan | 137078[U] |

[51] Int. Cl.$^4$ .......................................... H01L 41/08
[52] U.S. Cl. ..................................... 310/335; 73/642; 310/326; 310/327; 310/369; 310/800
[58] Field of Search ........ 310/800, 326, 327, 334–337, 310/367, 369; 73/597, 627, 629, 632, 642, 644; 367/151, 157, 159, 162, 165, 167

[56] References Cited

U.S. PATENT DOCUMENTS

| 2,922,140 | 1/1960 | Levine et al. | 310/335 X |
| 3,243,768 | 3/1966 | Roshon, Jr. et al. | 310/335 X |
| 3,748,637 | 7/1973 | Larson et al. | 310/335 X |
| 3,978,353 | 8/1976 | Kinoshita | 310/800 X |
| 4,025,805 | 5/1977 | Coltman et al. | 310/335 |
| 4,088,915 | 5/1978 | Kodama | 310/800 X |
| 4,186,323 | 1/1980 | Cragg et al. | 310/800 X |
| 4,486,869 | 12/1984 | Carter | 310/800 X |
| 4,495,817 | 1/1985 | Hunt et al. | 310/335 X |

Primary Examiner—Mark O. Budd
Attorney, Agent, or Firm—Moonray Kojima

[57] ABSTRACT

A transmitter-receiver of an ultrasonic distance measuring device comprising a cylindrical piezoelectric element made of a polymer in place of a piezoelectric vibrator of a ceramic material or the like which has heretofore been used. The cylindrical piezoelectric element is secured to a columnar supporter in such a manner as to define a chamber in cooperation with a recess which is provided in the peripheral surface of the supporter. The supporter is provided with a pressure equalizing bore which provides communication between the chamber and the outside. In addition, a conical reflector is provided so as to impart directivity to the ultasonic wave transmitted from the piezoelectric element.

7 Claims, 9 Drawing Sheets

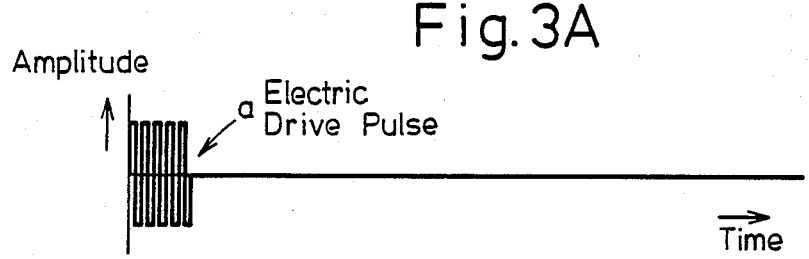
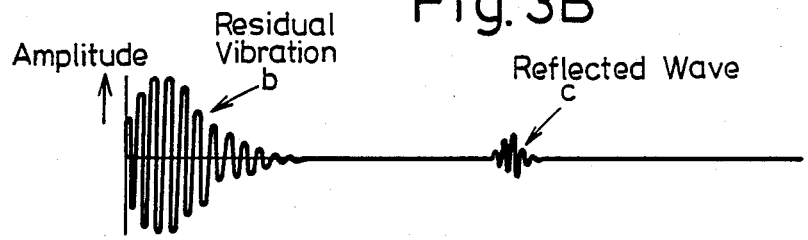
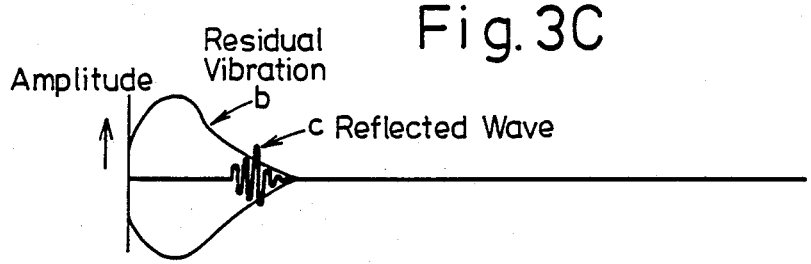
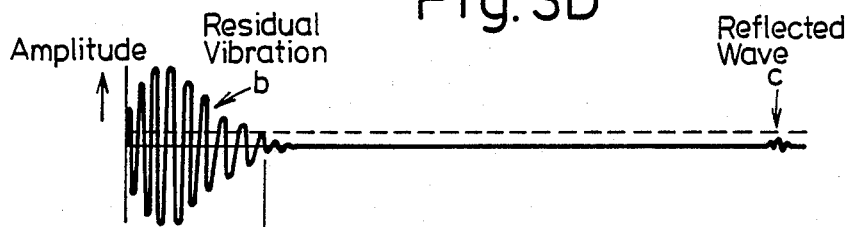
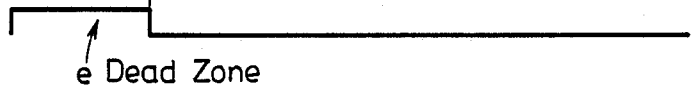

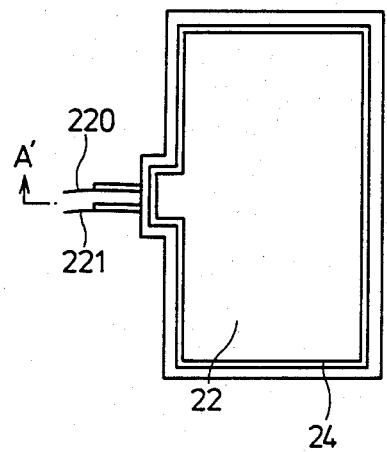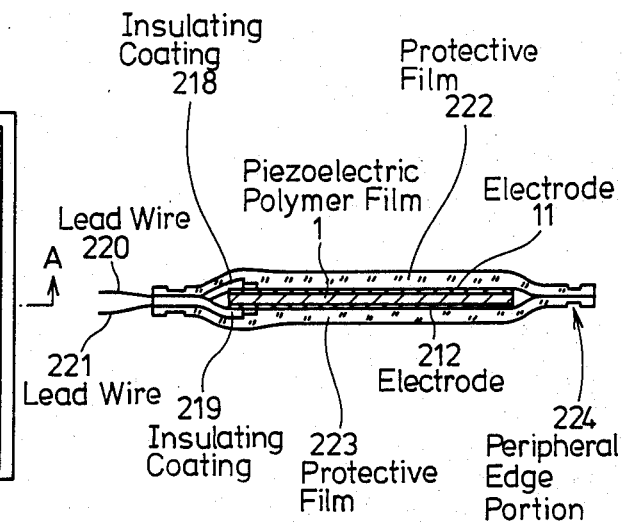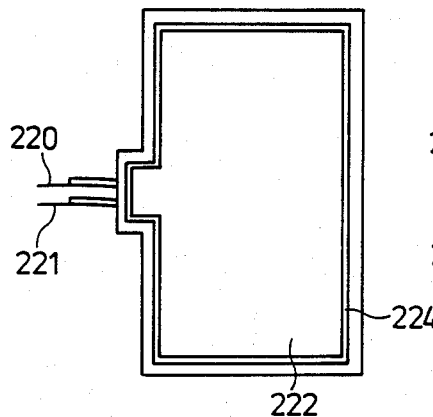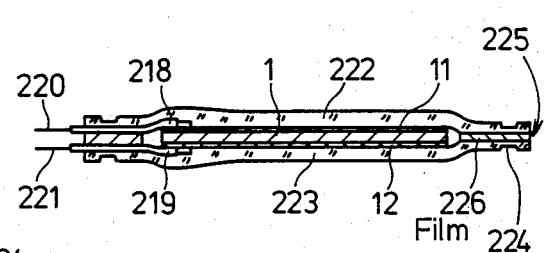

Fig. 21
Fig. 22
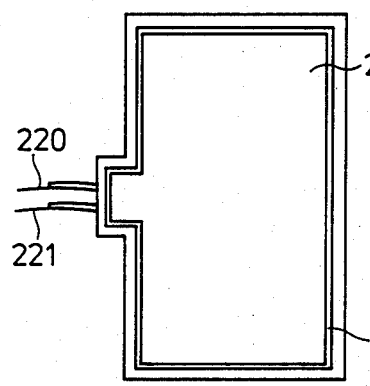
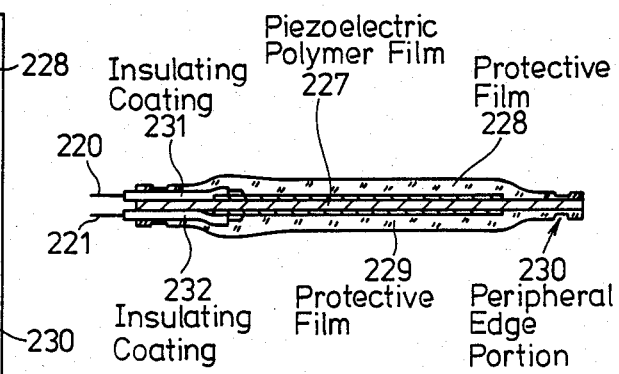

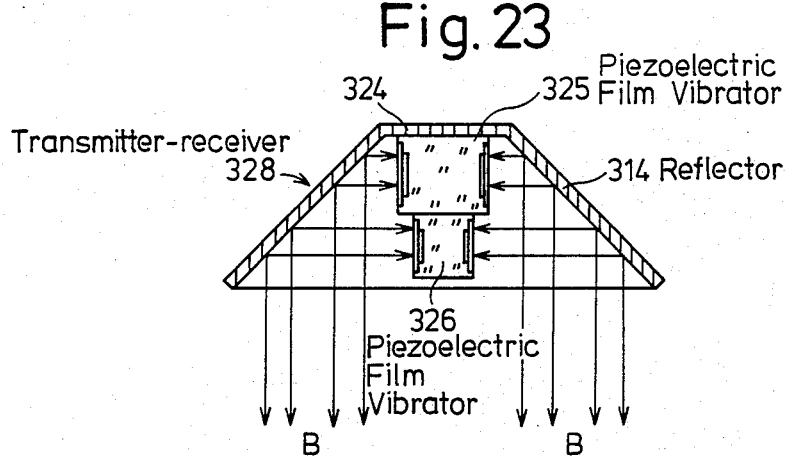
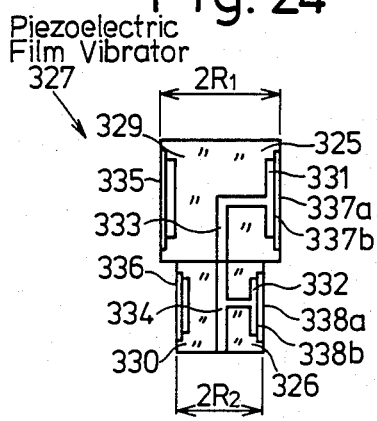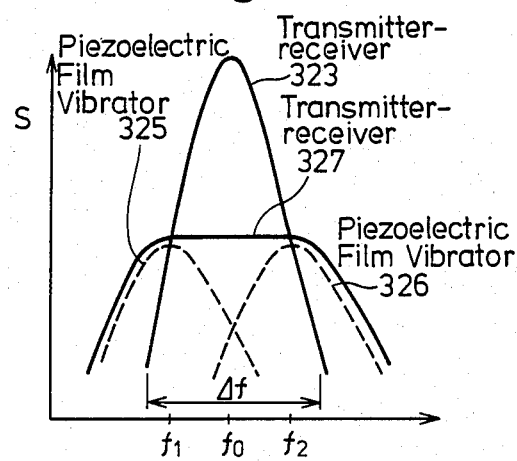
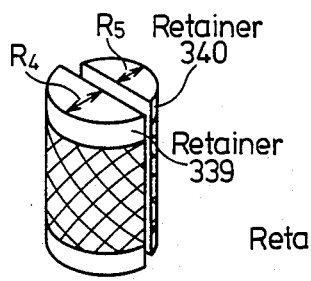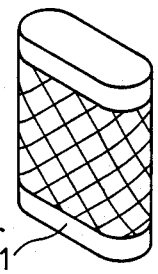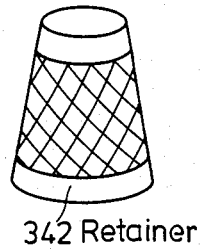

TRANSMITTER-RECEIVER OF ULTRASONIC DISTANCE MEASURING DEVICE

BACKGROUND OF THE INVENTION

1. Field of Invention

This invention relates to a transmitter-receiver of an ultrasonic distance measuring device which transmits an ultrasonic wave toward a surface to be measured and receives the ultrasonic wave reflected therefrom to measure the distance to the surface of measurement on the basis of, for example, the time interval from the transmission of the ultrasonic wave to the reception thereof.

2. Description of the Prior Art

FIG. 1 shows a conventional ultrasonic distance measuring device comprising a cylindrical piezoelectric vibrator 1a, made of a ceramic material; a plastic casing 2a, which also serves as an acoustic matching layer; a damping material 3a, for damping the piezoelectric vibrator 1a; and a reflector 4a, for changing the course of ultrasonic waves transmitted from and received by piezoelectric vibrator 1a to impart directivity to the ultrasonic waves.

The device operates as follows:

1. Transmission of ultrasonic waves.

When electric pulses are applied to piezoelectric vibrator 1a, vibrator 1a causes breathing vibrations in the radial direction, resulting in an ultrasonic wave which travels through the air in a normal direction with respect to the outer peripheral portion of piezoelectric vibrator 1a. This ultrasonic wave has its course changed by reflector 4a to travel downward (as viewed in FIG. 1) in the form of a doughnut shaped beam, as shown in FIG. 2.

2. Reception of ultrasonic waves.

The ultrasonic wave which enters the ultrasonic transmitter-receiver from the bottom (as viewed in FIG. 1) is converged by reflector 4a so as to pass through casing 2a and apply a stress to the outer peripheral portion of piezoelectric vibrator 1a. Vibrator 1a generates an electric field between electrodes which has an intensity corresponding to the level of the applied stress.

Examples of practical uses of the ultrasonic transmitter-receiver employing the above principles include a distance measuring device, a level meter, etc. In such devices, the following properties are required.

1. High damping characteristics.

An ultrasonic distance measuring device is an instrument wherein an ultrasonic wave is radiated toward an object and the interval of time t from the transmission of the ultrasonic wave to the arrival of the wave reflected from the object is measured to obtain the distance L to the object according to the following equation.

$$L = \tfrac{1}{2} ct \qquad (1)$$

wherein c is the sound veloicty in the propagation medium and t is as above defined.

However, since vibrator 1a is of ceramic and generally has a large inertia, even after the electric drive pulses shown in FIG. 3(A) have disappeared, attenuating vibration b (hereinafter referred to as "residual vibration b") continues, as shown in FIG. 3(B). For this reason, when the distance to the object of measurement is short, the reflected wave c may arrive at the transmitter-receiver while the residual vibration b still remains, as shown in FIG. 3(C), resulting in impossibility to separate and discriminate the two waves from each other. In other words, it is difficult to measure a point blank range.

Conversely, when the distance to an object of measurement is great, the amplitude of the reflected wave is extremely small as shown in FIG. 3(D). Therefore, it is necessary to amplify the voltage of the received signal to a substantial extent. Since in this simplification the electromotive force relative to the residual vibration b is also amplified, it is necessary, in order to prevent detection of the residual vibration b, to provide a prohibition region (called "dead zone") e so that detection of the reflected wave c is prohibited until the amplitude of the residual vibration b becomes smaller than that of the reflected wave c, as shown in FIG. 3(E).

Under those circumstances, if the distance measurement device is designed to measure long distances, it becomes impossible to measure short distances. On the other hand, if the device is designed to be capable of measuring short distances (i.e. to shorten the dead zone), it becomes difficult to measure long distances at which the amplitude of the reflected wave is relatively small.

In order to avoid these problems, it is the general practice to damp the piezoelectric vibrator 1a by means of damping material 3a as shown in FIG. 1. This conventional practice, however, involves the following problems.

1-A. It is considerably difficult to select a damping material which exhibits a satisfactory or appropriate damping effect over a wide temperature range. More specifically, most viscous substances change their physical properties to a substantial extent in accordance with temperature. Thus, it is, actually, not easy to find a damping material which exhibits the necessary and sufficient damping characteristics over a wide temperature range, from low temperature to high temperature.

1-B. To apply damping by means of a damping material is to suppress vibration. This leads to a reduction in the sound pressure at the time of transmission.

2. High-efficient transmission and reception characteristics.

It is preferable that transmission and reception of sound be effected with a minimum of electric power from the view point of energy conservation and safety.

The FIG. 1 device, however, suffers from the following problems in this respect.

2-A. Since damping is applied by means of the damping material 3a, it is necessary, in order to obtain a desired amplitude of vibration generated by the vibrator, to apply a considerably larger driving power than in the case of the piezoelectric vibrator 1a alone, for example, 10 times, i.e. about 1 kV in terms of voltage.

2-B. Since the acoustic impedance (ec, wherein e is density, and c is sound velocity) of the vibrator 1a is about 5 orders of magnitude larger than the acoustic impedance of air, the energy, which is transmitted into air when vibrator 1a vibrates, is extremely small. In order to overcome this problem, it is conventional practice to release sound into air through the casing 2a, serving as an acoustic matching layer, made of a plastic material which is acoustically softer (smaller in terms of acoustic impedance ec) than the vibrator 1a. When the thickness of layer 2a is set at a quarter wavelength, the energy propagation efficiency reaches its maximum. However, if the sound velocity relative to the plastic material used changes with temperature change, the equivalent thickness of the layer shifts from the quarter wavelength, resulting in the lowering of the sound propagation efficiency. The presence of layer 2a leads to a change of transmission and reception characteristics with temperature change.

3. Simple structure.

As just described, the conventional device of FIG. 1 needs associated elements such as damping material 3a and matching layer 2a in addition to the vibrator 1a, in order to bring the characteristics close to the ideal. As a result, the characteristics are greatly affected by these elements with respect to temperature change or the like. Ideally, it is preferable to eliminate the need for these extra elements.

SUMMARY OF THE INVENTION

Accordingly, it is an object of the invention to overcome the above and other deficiencies and disadvantages of the prior art.

Another object is to provide an ultrasonic transmitter-receiver which has a simplified structure, high damping characteristics and high efficiency.

BRIEF DESCRIPTION OF THE DRAWINGS

FIGS. 3(A)-3(E) are wave diagrams used to show the operation of the FIG. 1 embodiment.

FIG. 17 is a plan view depicting a third illustrative embodiment.

FIG. 18 is a sectional view taken along line AA of FIG. 17.

FIG. 19 is a plan view depicting a modification of the third illustrative embodiment of FIG. 17.

FIG. 20 is a sectional view taken along line AA of FIG. 19.

FIG. 21 is a plan view depicting a second modification of the third embodiment of FIG. 17.

FIG. 22 is a sectional view taken along line AA of FIG. 21.

FIG. 23 is a sectional view depicting a fourth illustrative embodiment.

FIG. 24 is a view depicting an essential part of the fourth illustrative embodiment of FIG. 23.

FIG. 25 is a graph depicting the operation of the essential part depicted in FIG. 24.

FIGS. 26, 27 and 28 are perspective views depicting modifications, respectively, of the fourth embodiment of FIG. 23.

DETAILED DESCRIPTION OF PREFERRED EMBODIMENTS

Figure 1:
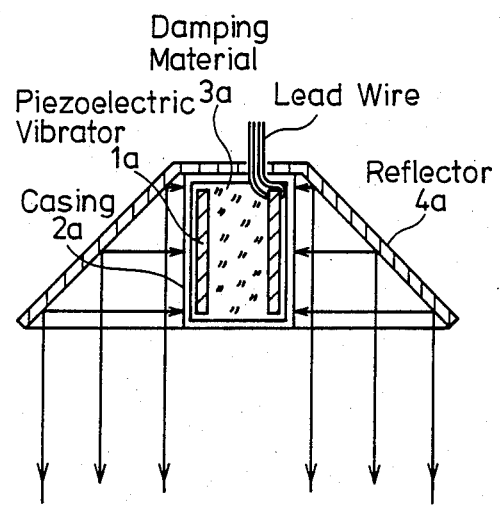
FIG. 1 is a section view of a conventional ultrasonic transmitter-receiver.
Figure 2:
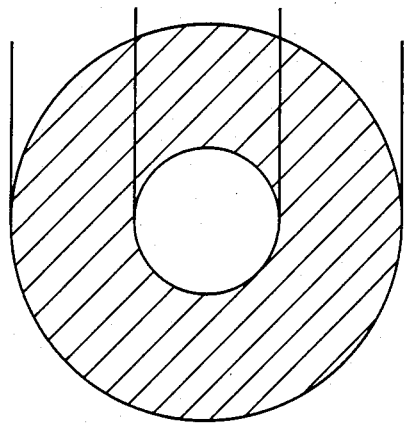
FIG. 2 is a bottom view of the embodiment of FIG. 1 depicting the shape of the reflected waves.

In the drawings, where similar parts are shown having the same numerical designations, more than one description will be omitted for clarity of description.

Figure 4:
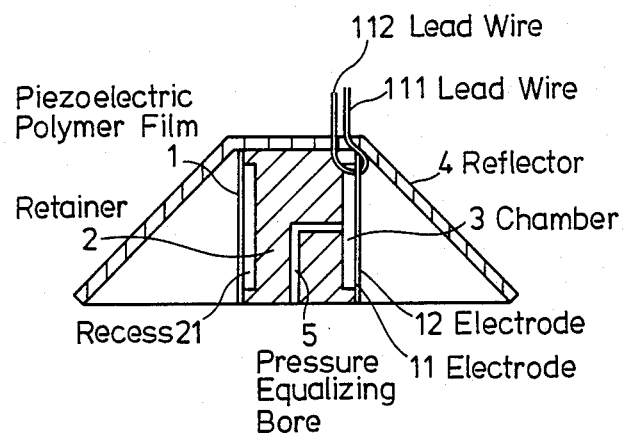
FIG. 4 is a sectional view depicting a first illustrative embodiment of the invention.
Figure 5:
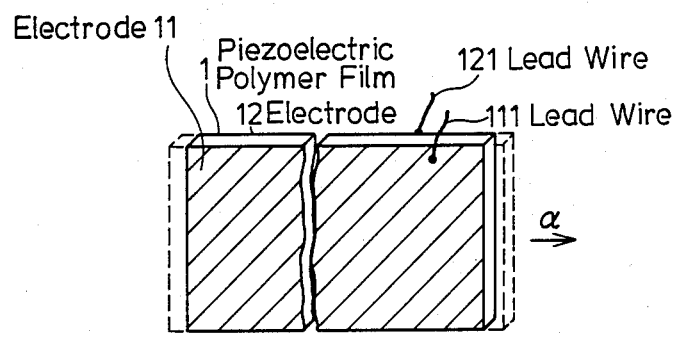
FIGS. 5 and 6 are perspective views depicting a piezoelectric polymer film.
Figure 6:
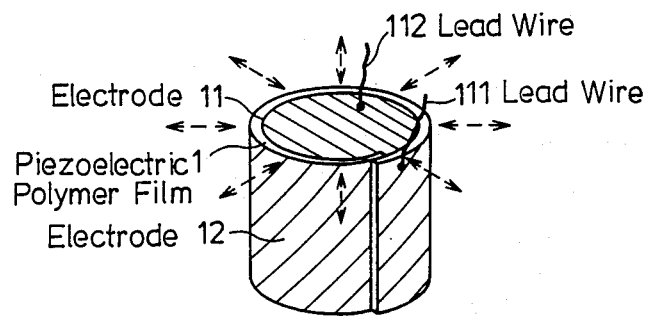

Turning now to FIG. 4, the embodiment comprises a cylindrical piezoelectric polymer film 1 which is first oriented circumferentially as shown in FIG. 5 and then formed into a cylindrical shape as shown in FIG. 6. In this case, polyvinylidene fluoride (PVDF) is used. Electrodes 11 and 12 are provided on both surfaces, respectively, of film 1. Lead wires 111 and 112 are each connected at one end thereof to corresponding electrode 11 and 12. A columnar supporter 2 supports film 1 at the upper and lower end faces thereof in such a manner that the breathing vibration of film 1 is not obstructed as much as possible. Supporter 2 is made of a plastic material which is superior in weather resistance, for example, TEFLON, vinyl chloride or the like. A recess 21 is provided in the peripheral surface of supporter 2 to cooperate with the film 1 to define a chamber 3. A conical reflector 4 is secured at its top side to one end of film 1 to impart directivity to ultrasonic waves which are transmitted and received. A pressure equalizing bore 5 is provided in supporter 2 to provide communication between chamber 3 and the outside.

Figure 7:
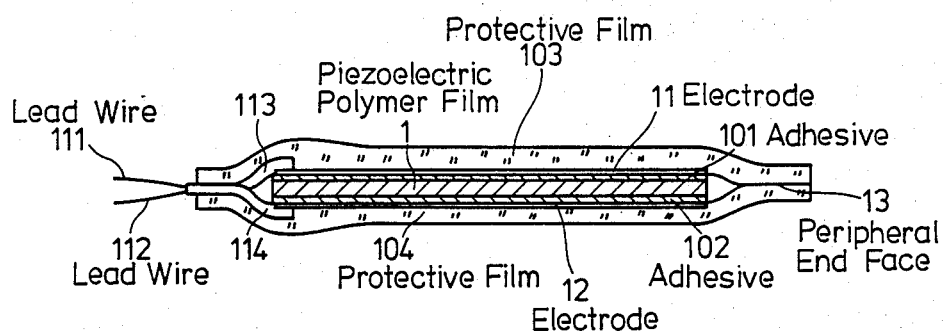
FIG. 7 is a section view depicting the film of FIGS. 5,6 in greater detail.
Figure 8:
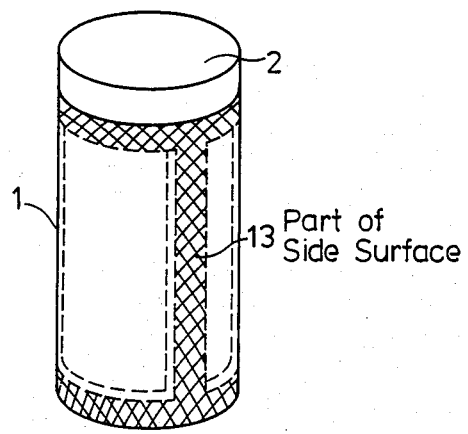
FIGS. 8, 9 and 10 are diagrams depicting the operation of the FIG. 4 embodiment.

In FIG. 7, film 1 has electrodes 11 and 12 secured to the upper and lower (as viewed in FIG. 7) sides thereof through adhesive layers 101 and 102, respectively, with electrodes 11 and 12 being covered with respective protective films 103 and 104. Lead wires 111 and 112 are led out from electrodes 11 and 12, respectively, and are covered with respective insulating coatings 113 and 114.

Protective films 103 and 104, which are made of, for example, polytetrafluoroethylene, are bonded to the electrodes 11 and 12 by means of an adhesive. The respective peripheral end faces 13 of films 103 and 104 are also bonded together by means of an adhesive. Electrodes 11 and 12 may also be formed directly on film 1 by, for example, sputtering, evaporation, or plating. It should be noted that electrodes 11 and 12 and lead wires 111, and 112 are connected together by means of an electrically conductive adhesive or soldering.

In the embodiment, when electric pulses are applied to film 1, film 1 expands and contracts in the direction of orientation α. However, since film 1 is formed in a cylindrical shape, the expanding and contracting motion of film 1 is converted into breathing vibration in the radial direction, thus generating an ultrasonic wave. The resulting ultrasonic wave has its course changed by reflector 4 so as to travel downward (as viewed in FIG. 4) in the form of a doughnut shaped beam.

On the other hand, application of external pressures to film 1 causes it to expand and contract, resulting in voltage being generated between electrodes 11 and 12. In other words, the device shown in FIG. 4 performs an operation which is similar to that of the FIG. 1 device.

Piezoelectric polymer film 1 has the following advantages. The acoustic impedance is small so that it is easy to obtain matching with water, air or the like. The attenuation of energy inside the film is large, so that it is possible to effect transmission and reception of pulses having a short duration. Also, since the film is flexible, it is easy to produce and process in the form of a thin film. With these advantageous features used effectively, the vibration in the longitudinal direction of the film is converted into vibration in the radial direction to thereby generate an ultrasonic wave, as shown in FIG. 4.

If the curvature radius, elastic coefficient and density of the film are represented by R, $C^E$, and e, the resonance frequency $f_0$ of the film is expressed as follows.

$$f_0 = \frac{1}{2\pi R} \sqrt{\frac{C^E}{e}} \quad (2)$$

Accordingly, assuming that $C^E = 113 \times 10^9 (N/m^2)$ and $e = 1.8 \times 10^3 (kg/m^3)$, it is possible to effect transmission and reception of an ultrasonic wave of about 40 kHz by setting the radius of supporter 2 at 10 mm in the arrangement shown in FIG. 4.

Additional advantages obtained by using the film 1 will next be further discussed in comparison with the piezoelectric vibrator of the prior art which uses ceramic material.

1. In the case of transmission.

1-i. The absolute value of the pressure of sound which is radiated into air is proportional to velocity $v$ of the vibration source, provided that the frequency of the vibration source and the radiating area are constant. Velocity $v$ is proportional to displacement X of the vibration source if the frequency is constant. Let us consider the conversion efficiency, that is, the relationship between voltage V applied to film 1 and displacement X thereof. If a voltage V is applied between electrodes 11 and 12 which are provided on both sides, respectively of film 1, an elongation $\Delta l$ of film 1 in the direction of orientation, that is, an increase in the outer circumference of the cylinder, may be calculated according to the following equation.

$$|\Delta l/l| = |S| = d_{31}E = d \cdot V/t \quad (3)$$

wherein l is the length ($=2\pi r$; $r=$radius) of film 1, t is the thickness of film 1 and $d_{31}$ is the electrostrictive constant of film 1.

It will be understood from equation (3) that the value of $\Delta l$ increases as the electrostrictive constant of film 1 increases or as thickness t decreases. As the value of $\Delta l$ increases, the amplitude X of the breathing vibration of the film 1 also increases. The electrostrictive constant $d_{31}$ of film 1 is generally one order of magnitude smaller than that of vibrator 1a of FIG. 1 which is made of a ceramic material, such as PZT. However, thickness t of film 1 can be made considerably smaller than that of vibrator 1a. Film 1 enables, advantageously, a large $\Delta l/l$ to be obtained at an efficiency which is several times as high as that in the case of PZT of the prior art.

For example, assuming that electrostrictive constant $d_{31}$ and thickness t of film 1 are $10 \times 10^{-12} (C/N)$ and 40 μm, respectively, and those of PZT are $100 \times 10^{-12} (C/N)$ and 2 mm, respectively, the value of $\Delta l/l$ in the case of film 1 is 5 times that in case of PZT of the prior art.

More specifically, in the case of the ceramic vibrator, it is impossible to form a cylindrical film having a thickness of the order of 10 μm because of relatively low impact strength. On the other hand, film 1 can be made considerably thin and thus can compensate for the relatively small electrostrictive constant $d_{31}$.

1-ii. Since film 1 is a high molecular compound, the attenuation of energy inside thereof is large. This appears as being an enhanced damping effect. Thus, it is not necessary to apply damping by means of a special damping material 3a as in the prior art device of FIG. 1.

1-iii. The above advantage 1-ii further enables avoidance of a reduction in the amplitude of vibration due to damping material 3a. In the prior art, the amplitude is reduced to about 1/10 or less. Taking into consideration this advantage in conjunction with the difference in the efficiency described in advantage 1-i, the value of amplitude X obtained when the same voltage is applied is from several tens to several hundreds of times that in the prior art arrangement.

1-iv. Transmissivity T of energy from the vibrator into air is expressed as follows.

$$T = \frac{4 Z_1 Z_2}{(Z_1 + Z_2)^2} \quad (4)$$

wherein $Z_1$ is the acoustic impedance of the vibrator, and $Z_2$ is the acoustic impedance of air.

If $Z_1$ is approximately equal to $3 \times 10^6 (NS/m^3)$ of the piezoelectric polymer film 1 and $Z_1$ is approximately equal to $30 \times 10^6 (NS/m^3)$ of the PZT of the prior art, and $Z_2$ is approximately equal to $400 (NS/m^3)$ of air, and are applied in the above equation (4), the following results are obtained.

$$\frac{T_1}{T_2} = \frac{0.53 \times 10^{-3}}{0.053 \times 10^{-3}} = 10$$

wherein $T_1$ is the transmissivity of energy from film 1 into air; and $T_2$ is the transmissivity of energy from PZT of vibrator 1a into air.

In the prior art arrangement that uses PZT, the acoustic matching layer 2a is used to improve the low transmissivity. In the case of the film 1 of the invention, however, it is possible to propagate energy at relatively high efficiency without any particular need to use such a matching means.

2. In the case of reception.

2-i. The open terminal voltage V which is generated between both surfaces of film 1 by force F applied externally during reception (in the direction of orientation of the film 1) is expressed as follows.

$$|E| = |V/t| = g_{31} \cdot p = g_{31} \cdot F/l \cdot t$$

$$\therefore |V| = g_{31} \cdot F/l \quad (5)$$

wherein l is the stress; l is the width of the film; and $g_{31}$ is the voltage output constant.

Voltage output constant $g_{31}$ of film 1 has a value which is about 10 to 20 times that of a vibrator 1a made of ceramic material, e.g. PZT. Thus, film 1 enables a higher $|V|$ to be obtained for the same level of force F.

2-ii. The advantage obtained due to the absence of the damping material (which has been stated in the description of advantages in the case of transmission) is also available in the case of reception. Accordingly, it is possible in the case of reception also to increase the total efficiency to a level which is from several tens to 200 times as high as that in the prior art arrangement. As a result, according to the invention, a function and transmission-reception efficiency which is equal to or higher than those in the prior art arrangement, which uses a ceramic vibrator 1a, can be realized at a power consumption which is 1/1000 or less than that in the case of the prior art arrangement.

The characteristics of an actual ultrasonic transmitter-receiver will be set forth next. Piezoelectric polymer film 1, having a thickness of 50 μm, was secured to a supporter 2 having a radius of 10 mm and a height of 30 mm in such a manner that each of the upper and lower end portions of film 1 was stuck to supporter 2 over a width of 2 mm to produce an experimental utltrasonic transmitter-receiver. The sensitivity of the apparatus in transmission and reception with respect to an object at a distance of 800 mm from the front surface of reflector 4 was as follows. Transmission was 120 dB (0dB=2×10$^{-4}$μbar). Reception was −30dB(0dB=1V/μbar).

The above results show that the ultrasonic transmitter-receiver of the invention had a total sensitivity in transmission and reception which was 500 to 1000 times as high as that of the prior art arrangement.

It should be noted that, in the measurement of transmission sensitivity, the driving voltage of the driving circuit was set at 10 Vp-p. In order to eliminate the reactive component, due to the capacitance component of the film 1, both of them were matched with each other with an appropriate inductance.

Although in the above actual example, the thickness of the film 1 was set at 50 μm, if film 1 is excessively thin, film 1, when formed in a cylindrical shape, cannot maintain its own tension which is required for transmission and reception. In addition, the production of a piezoelectric polymer film 1 becomes difficult. On the other hand, if film 1 is excessivley thick, the transmission sensitivity is reduced, as will be understood from equation (3). The values which are appropriate for actual use are in the range preferably from 25 to 100 μm.

Figure 9:
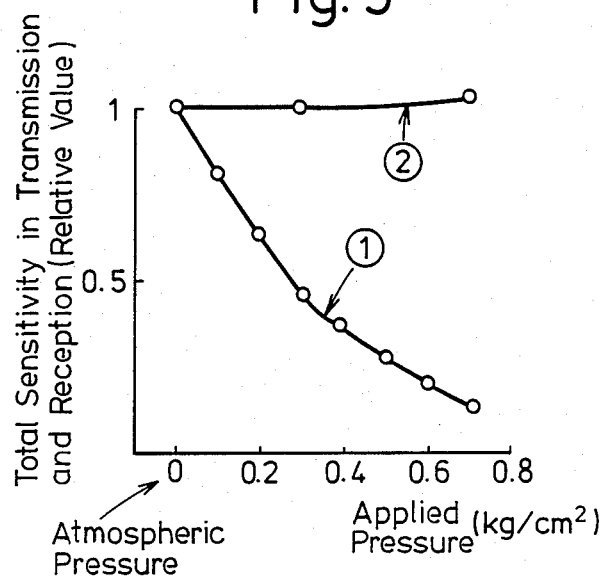

FIG. 9 compares the total sensitivity in transmission and reception, in the case where the pressure equalizing bore 5 is provided, and that in the case where no pressure equalizing bore 5 is provided. The curve 1 represents total sensitivity in the case where no pressure equalizing bore 5 is provided, while curve 2 represents the case where a pressure equalizing bore 5 is provided. When pressure increases due to change in ambient pressure, if there is no pressure equalizing bore 5, the sensitivity decreases suddenly as the pressure increases. On the other hand, if pressure equalizing bore 5 is provided, there is no lowering in sensitivity.

Figure 10:
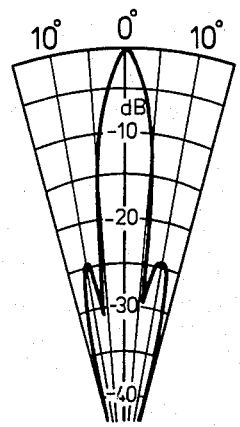

FIG. 10 depicts directivity expressed by the level of the reflected sound from reflector 4 measured at a position 3 m forward of the transmitter-receiver. Reflector 4 enables obtaining of sharp directivity, i.e., a halving angle of 4 or less. Thus, it is possible to realize ideal characteristics for a distance measuring device or a level meter. As a result, the following advantages are attained.

1. Since the attenuation of energy inside film 1 is sufficiently large, it is possible to effect transmission and reception of an ultrasonic wave with high damping characteristics without the need to use a damping material.

2. Since no damping material is used, there is no energy loss due to the presence of the damping material. Thus, it is possible to effect transmission and reception at high efficiency.

3. Since the acoustic impedance of film 1 is one order of magnitude smaller than that of the prior art vibrator 1a made of ceramic material, it is possible to obtain a high efficiency in transmission and reception of sound into and from the air.

4. Since the thickness of film 1 can be reduced, it is possible to enhance the electric field intensity at the time of transmission and hence increase the transmission efficiency (i.e. it is possible to increase the amount of displacement of film 1).

Also, at the time of reception, the thinness of film 1 has no effect on the output. On the other hand, high voltage output constant $g_{31}$ of film 1 itself enables a high open terminal voltage to be obtained.

Thus, it is possible to greatly improve both transmission and reception efficiencies.

5. Since it is not necessary to use a damping material, an acoustic matching layer, or the like, it is possible to avoid a change in temperature characteristics which are attributable to change in the physical properties of these materials.

6. Accordingly, it is possible to realize high performance at a considerably lower rate of power consumption in comparison with the prior art arrangement of FIG. 1.

7. Since film 1 is secured only at the upper and lower end faces thereof, it is possible to obtain unrestricted free breathing vibration. As a result, it is possible to attain high transmission and reception sensitivity.

8. The provision of pressure equalizing bore 5 enables realization of an ultrasonic transmitter-receiver wherein the sensitivity is not affected by the ambient pressure.

9. The use of reflector 4 enables realization of an ultrasonic transmitter-receiver having excellent directivity which is most suitable for a distance measuring device.

Although supporter 2 is made of a plastic material, it may also be made of metal, for example, stainless steel, and be used also as a lead portion which is connected to the inner electrode of film 1. Moreover, if supporter 2 is made of a ceramic material, such as alumina, it is possible to form the supporter into complex shapes by means of sintering, which would minimize processing requirements and reduce production costs. Furthermore, ceramic materials have excellent weather resistance and chemical resistance. If the ceramic supporter 2 surface is subjected to a metal coating, i.e. metalization, it is advantageously possible to utilize it as a lead portion of the inner electrode.

Although film 1 is made of polyvinylidene fluoride (PVDF), the material is not limited thereto. For example, a copolymer of vinylidene fluoride and trifluoroethylene (P(VDF-TrFE), a copolymer of vinylidene fluoride and tetrafluoroethylene (P(VDF-TeFE), or an an alternating copolymer of vinylidene cyanide and vinyl acetate (P(VDCN-VAC) may be used. Any material which exibits good piezoelectric properties may be used. It is not always necessary to orient the material used, but, it may be subjected only to polarization effected by application of a high voltage.

The first embodiment of the invention depicted in FIG. 4 has a few drawbacks. For example, since film 1 is made of a fluorine polymer material, for example, PVDF, it has excellent corrosion resistance and hence is not affected by most corrosive gases. However, since it is difficult to bond such a material, there is difficulty in forming electrodes on such film 1. Also when electrodes are formed on such film 1 by sputtering a metal, even if it is gold or the like, since the bond strength is low, the electrodes are readily separated as a result of penetration of a corrosive gas or elongation of film 1 due to moisture absorption.

Moreover, the arrangement of film 1 shown in FIG. 7 may suffer from separation of electrodes 11 and 12 and adhesive layers 101 and 102 because of the relatively low corrosion resistance of protective films 103 and 104 and penetration of corrosive gas into films 103 and 104. If separation occurs, an air layer is produced in the medium and sound is reflected thereby, which results in considerable lowering of the acoustic conversion efficiency. Furthermore, since protective films 103 and 104 and adhesive layers 101 and 102 are added to film 1, the overall rigidity increases, so that the acoustic conversion efficiency is reduced.

Figure 11:
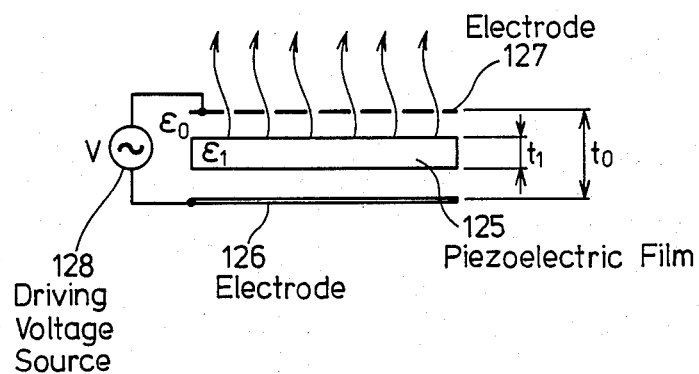
FIGS. 11, 12 and 13 are diagrams depicting principles of a second illustrative embodiment.
Figure 12:
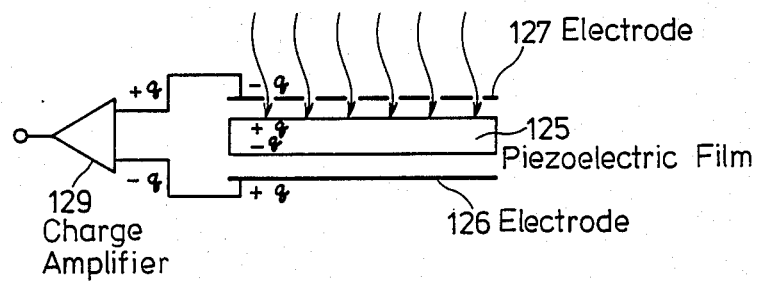
Figure 13:
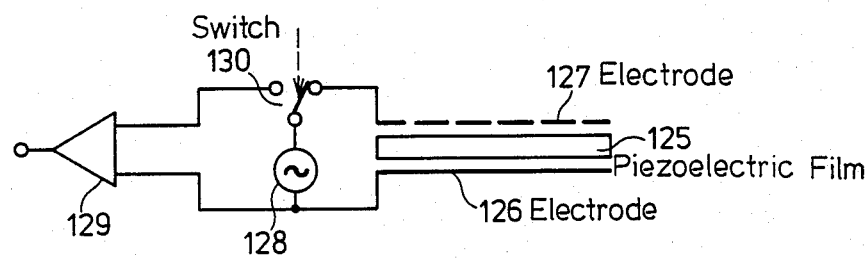

The second illustrative embodiment, which is depicted in FIGS. 11 through 16, resolves these and other drawbacks. Turning first to FIGS. 11, 12, and 13, which describe the basic principles of the embodiment, FIG. 11 shows the principle on the basis of which an ultrasonic wave is transmitted toward a surface of measurement. Depicted is a piezoelectric film 125 having a film thickness of $t_1$. Two electrodes 126 and 127 are disposed at respective positions which are spaced apart from film 125 in such a manner that electrodes 126 and 127 sandwich film 125. Electrode 127 is formed from a metal net having uniform openings. The distance from electrode 127 to electrode 126 is $t_0$.

When a driving voltage V, having a high frequency which includes the thickness resonance frequency of film 125, is applied between electrodes 126 and 127 from a driving voltage source 128, a high frequency electric field is generated between electrodes 126 and 127. Assuming that the dielectric constant of film 125 is $\epsilon_1$ and the dielectric constant of the space is $\epsilon_0$, the intensity of electric field $E_1$ which is applied to film 125 is express as follows.

$$E_1 = V/\{t_1 + \epsilon_1/\epsilon_0(t_0 - t_1)\}$$

Film 125 is caused to vibrate in the direction of its thickness by applied electric filed, thus generating an ultrasonic wave in accordance with the field intensity $E_1$. Since mesh-like openings are provided in electrode 127 disposed at the side of film 125 toward which the ultrasonic wave travels, the ultrasonic wave is transmitted toward a surface of measurement while being diffracted by these meshes. Accordingly, the loss of the ultrasonic wave due to the reflection by electrode 127 is considerably small.

FIG. 12 depicts the principle on the basis of which the reflected wave from the surface of measurement is detected. Film 125 is strained in accordance with the sound pressure of the ultrasonic wave reflected from the surface of measurement, thus generating electric charge ±g. This charge ±g causes an induced charge to be produced on electrodes 126 and 127. The induced charge is detected in a charge amplifier 129 and converted into voltage, which is then delivered to a converter section (not shown) wherein the distance from the ultrasonic transmitter-receiver to the surface of measurement is calculated.

FIG. 13 shows an arrangement wherein the transmission mode of FIG. 11 and the reception mode of FIG. 12 are combined together. As shown, a switch 130 is changed over between driving voltage source 128 and charge amplifier 129 to thereby change over the transmission and reception modes from one to othe other.

Although in this embodiment, the transmission and reception of ultrasonic waves are carried out at the upper side of film 125, as viewed in the figures, if it is necessary to carry out transmission and reception at the lower side also, electrode 126 also needs to be provided with openings. It is preferable to form the openings in the electrode 126 uniformly throughout.

Figure 14:
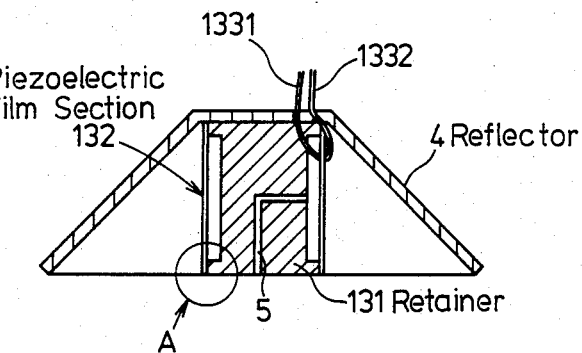
FIG. 14 is a sectional view depicting a second illustrative embodiment.

The second illustrative embodiment is depicted generally in FIG. 14 and is substantially the same as FIG. 4 except for the arrangement of the piezoelectric film and its vicinities. A piezoelectric film section 132 is formed along the side surface of a supporter 131 disposed inside reflector 4. Lead wires 1331 and 1332 are led out from film section 132.

Figure 15:
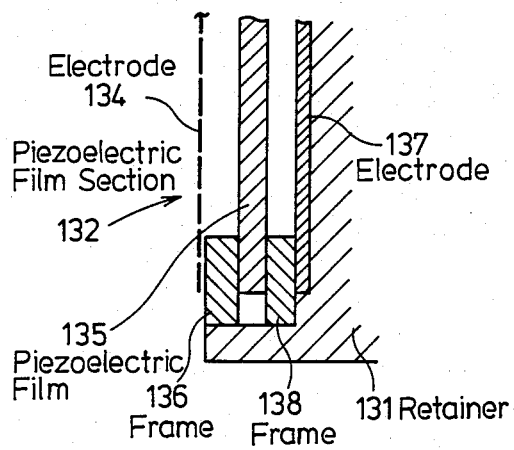
FIG. 15 is a pictorial diagram depicting an essential part of the second illustrative embodiment.

FIG. 15 depicts greater details of the film section 132 and areas thereabout. An electrode 134 which is formed from a net having openings uniformly provided therein is disposed at the outermost position in a recess formed in the peripheral surface of the supporter 131, electrode 134 being secured to a piezoelectric film 135 by means, for example, of insulating screws through an insulating frame 136. Another electrode 137 is similarly secured to film 135 through an insulating frame 138 and is also secured to supporter 131. These electrodes 134 and 137 are preferably formed using, for example, stainless steel or Hastelloy C from the view point of corrosion resistance.

Figure 16:
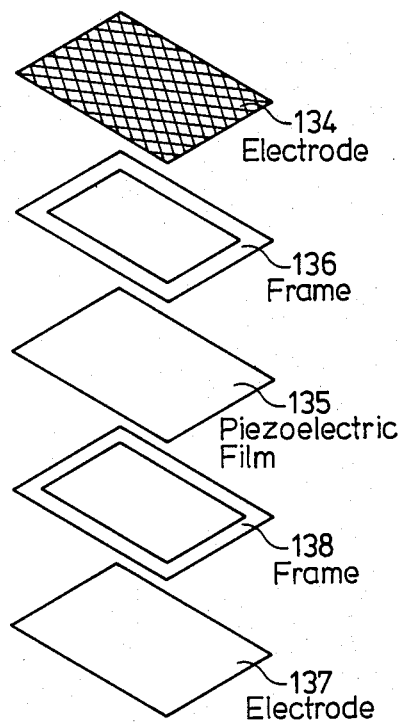
FIG. 16 is an exploded perspective view depicting essential parts of the arrangement of FIG. 15.

FIG. 16 is an exploded perspective view of the film section 132, wherein piezoelectric film section 132 is shown formed by superposing electrode 134, frame 136, film 135, frame 138 and electrode 137, in that order. The spacing between electrode 134 and film 135 and the spacing between electrode 137 and film 135 are determined by the respective thicknesses of frames 136 and 138.

In this second embodiment, a spacing is provided between the piezoelectric film and each electrode with the ultrasonic wave being thus being transmitted and received. Thus, there is no probeem of separation of electrodes from the film. Accordingly, it its possible to maintain the life of the apparatus for a long period of time even if it is used in a corrosive gas atmosphere, and there is no reduction of acoustic conversion efficiency due to corrosion. Moreover, since it is possible to connect together the electrodes and lead wires by means of welding, high reliability can be maintained. Furthermore, since no added elements are used which increase the rigidity of the film, such as adhesive, the acoustic conversion efficiency is also improved.

In the FIG. 7 embodiment, film 1 is covered with protective film 103 and 104 which are formed using polytetrafluorethylene for the purpose of protecting against corrosion. However, since the respective peripheral end faces 13 of films 103 and 104 are bonded together by means of an adhesive, the overall corrosion resistance is lowered, depending on the adhesive used. Since polytetrafluoroethylene is originally difficult to bond, it is impossible to bond sufficiently this resin material itself. Moreover, the gas permeability of this material is higher than those of other polymer materials. Thus, protective films 103 and 104 cannot sufficiently protect piezoelectric polymer film 1 in certain respects.

The third illustrative embodiment handles this drawback and provides further improvements and is depicted in FIGS. 17 through 22, wherein FIGS. 19 and 20 show a first modification and FIGS. 21 and 22 show a second modification of the embodiment of FIGS. 17 and 18.

In FIGS. 17 and 18, electrodes 11 and 12 are bonded to the upper and lower surfaces, respectively, of piezoelectric polymer film 1, and lead wires 220 and 221, which are covered with insulating coatings 218 and 219, for example, made of polydifluoroethylene, are led out from these electrodes 11 and 12, respectively. The surfaces of electrodes 11 and 12 are covered with protective films 222 and 223, made of, for example, polydifluoroethylene, and the respective peripheral edge portions 224 of protective films are bonded together in one unit by melting protective films 222 and 223 by means, for example, ultrasonic welding.

The protective films 222 and 223 may be made of polytri-, di- or mono- fluoroethylene which is excellent in terms of corrosion resistance and which has low permeability to gas and water vapor, e.g., polychlorotrifluoroethylene (PCTFE), polyvinylidene fluoride (PVDF), and polyvinyl fluoride (PVF). These are fluorine contained polyethylene materials which are of the same kind of polytetrafluoroethylene, but the former has extremely lower gas permeability than that of the latter. In particular, PVDF is also excellent in terms of mechanical strength and thus is considered to be preferred for use as the protective films when evaluation is made from various aspects, such as, for example, corrosion resistance, permeability to gas and water vapor, mechanical strength, etc.

Protective films 222 and 223 are required to have a thickness of about 25 μm or more in order to function as a protective film. However, protective films 222 and 223 act as a load with respect to film 1. It has been experimentally confirmed that film 1 must have a thickness which is 2 times or more that of protective films 222 and 223 in order to overcome the load.

Turning to FIGS. 19 and 20, protective films 222 and 223 are relatively thin (for example about 25 μm), satisfactory welding strength cannot be obtained. In such a case, if a film 226 which is made of the same material as that of protective films 222 and 223 and which has an appropriate thickness is inserted into the area between the respective peripheral edge portions 225 of films 222 and 223 to thereby increase the overall thickness, the welding strength is increased.

It has been experimentally confirmed that the highest welding strength is obtained when the overall thickness is set at 90 μm to 100 μm.

Turning to FIGS. 21 and 22, in many cases, fluorine-containing resins, e.g. PVDF, are used as material for the piezoelectric polymer film 227. In such a case, the dimensions of film 227 are increased so that it is extended as far as the end faces of films 228 and 229, and these films 228 and 229, which are of a fluorine containing resin and which is of the same kind as that of film 227, are ultrasonic welded together at their respective peripheral edge portions 230 through film 227 itself. By doing so, films 228 and 229 are melted at their peripheral edge portions 230. Thus, satisfactory sealing is obtained.

If lead wires 220 and 221 are covered with insulating coatings 231 and 232 of a fluorine-containing resin which is of the same kind as that of the protective films 228 and 229, lead wires 220 and 221 can be formed in one integral unit by means of ultrasonic welding, so that sealing is optimally obtained.

Although the electrodes are bonded to the piezoelectric polymer film, the invention is not so limited. It is also possible to first form electrodes on the inner sides of the protective films and then bond these films to a piezoelectric polymer film. Moreover, although the peripheral edge portions of the protective films are bonded together by ultrasonic bonding, the bonding or welding method used is not so limited. For example, laser welding may be used. Furthermore, where the protective films use materials other than the fluorine-containing resins, it is possible to use polyether ketone (PEEK) as a material which has good corrosion resistance and small permeability to gas and water vapor.

Thus, in this third illustrative embodiment, both surfaces of the piezoelectric polymer film are covered with protective films and the peripheral edge portions of these films are bonded by utilizing autohesion. Accordingly, satisfactory sealing is provided even in a corrosive gas atmosphere.

The first illustrative embodiment of FIG. 4, although having various advantages, also suffers from a few drawbacks, such as the resonance frequency $f_0$ changes in inverse proportion to the curvature radius R, which means that it changes in accordance with the thermal expansion of outer surface of supporter 2. The elastic modulus $\epsilon$ is also affected by the temperature. For example, it it is assumed that supporter 2 is made of rigid vinyl chloride, while the piezoelectric polymer film 1 is made of PVDF, and the curvature radius R is set at 10 cm, then the resonance frequency $f_0$ is 40 kHz at 20° C. However, there are frequency variations of about 3 kHz/20° C.

Also, the Q factor, which represents the sharpness of resonance, of a piezoelectric film of a polymer is smaller than that of a piezoelectric vibrator of a ceramic material, but is not satisfactorily small, so that, even if the driving frequency is maintained at a constant level, the sensitivity in transmission and reception is lowered considerably in accordance with changes in temperature.

To overcome the above drawback, it has been considered, for example, to make temperature compensation in which the ambient temperature is detected and the driving frequency is shifted close to the resonance frequency on the basis of the detected temperature. This method, however, has the problem that the signal processing is complicated. It has also been considered to provide a damping material around the piezoelectric polymer film to lower the Q factor and to thereby reduce the effect of variations in temperature. However, this method does not function effectively in actual practice.

The fourth illustrative embodiment, which is depicted in FIGS. 23 through 28, overcomes the foregoing and other drawback. In FIG. 23 a reflector 314 is depicted having a flat portion 324 at the upper side thereof (as viewed in FIG. 23). A columnar piezoelectric polymer film vibrator 325, which has a predetermined curvature radius $R_1$, is secured at one end to flat portion 324. Another piezoelectric polymer film vibrator 326, having a curvature radius $R_2$, which is different from the curvature radius $R_1$ of film vibrator 325, is secured to the other end of vibrator 325. Piezoelectric film vibrators 325 and 326 have respective resonance frequencies $f_1$ and $f_2$ and these two vibrators are combined together to constitute a piezoelectric film vibrator 327 having a center resonance frequency $f_3$.

The piezoelectric film vibrator 327 and reflector 314 constitute in combination an ultrasonic transmitter-receiver 328.

The arrangement of FIG. 23 is similar to the arrangement in FIG. 4, with certain differences to be discussed. As shown in FIG. 24 the fourth embodiment has a supporter 329 and 330, having a diameter $2R_1$ and $2R_2$; a recess 331 and 332 provided in the peripheral surfaces thereof; a pressure equalizing bore 333 and 334, which provides communication between the recess and the outside; a piezoelectric film 335 and 336, disposed at the outer peripheral plane of the recess; and electrodes 337a and 337b and 338a and 338b, which are provided on both outer and inner peripheral surfaces, respectively, of the piezoelectric film.

The operation of the embodiment of FIG. 23 will now be described in connection with FIG. 25, wherein the abscissa represents the resonance frequency, and the ordinate represents the sensitivity S. Vibrator 325 has frequency characteristics in which resonance frequency $f_1$ is the peak, while piezoelectric film vibrator 326 has frequency characteristics in which resonance frequency $f_2$ is the peak. Ultrasonic transmitter-receiver 327 has frequency characteristics obtained by combining together the respective frequency characteristics of piezoelectric film vibrators 325 and 326, such as those shown by curve 327. As is clear from the graph of FIG. 25, ultrasonic transmitter-receiver 327 has a frequency characteristic curve which is substantially flat within a range of a frequency change $\Delta f$ with temperature with respect to center fresonance frequency $f_0$.

In contrast, the frequency characteristic curve 323 of the transmitter-receiver of FIG. 4, shows the highest sensitivity at the resonance frequency $f_0$ but is reduced by a large margin at the extremities of the frequency change range $\Delta f$.

Thus, it was found that the transmitter-receiver of FIG. 23 is not readily affected by temperature change.

FIGS. 26, 27 and 28 depict various modifications of the fourth illustrative embodiment of FIG. 23. FIG. 26 shows a modification wherein two half columnar supporters 339 and 340, which have different curvature radii, are used. The half columnar supporter 339 has a curvature radius $R_4$, while the other half columnar supporter 340 has a curvature radius $R_5$, with $R_4$ being greater than $R_5$. These two supporters are disposed in such a manner that their respective flat sides face each other. Thus, ultrasonic waves which include resonance frequencies respectively corresponding to the curvature radii $R_4$ and $R_5$ are radiated.

FIG. 27 depicts another modification of FIG. 23 wherein supporter 341 is formed into an oval cross-sectional configuration so that it has various resonance frequencies.

FIG. 28 depicts a further modification of FIG. 23 wherein supporter 342 is formed into a frusto-conical configuration so that it has various resonance frequencies.

Thus, according to this fourth embodiment, ultrasonic waves are transmitted from vibrating surfaces having various curvatures so that the curve representing composite frequency characteristics of the ultrasonic waves, which are radiated from the surfaces having various curvatures, is flat over a predetermined range around the center frequency. Accordingly, it is possible to prevent the sensitivity from becoming reduced in accordance with change in temperature over a wide temperature range. As a result, the arrangement of the signal processing circuit is simplified, and the operational stability is improved.

The term "supporter" as used herein is also used interchangeably with the term "retainer" in the drawing.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A transmitter-receiver of an ultrasonic distance measuring device comprising
   a columnar supporter;
   an annular recess provided in the peripheral surface of said supporter with both end portions thereof remaining;
   a cylindrical piezoelectric polymer film secured to said end portions of said peripheral surface of said supporter to cooperate with said recess to define a chamber;
   electrodes provided on the outer and inner peripheral surfaces, respectively, of said piezoelectric polymer film;
   a conical reflector connected at its top to one end of said supporter to impart directivity to ultrasonic waves transmitted and received so that the transmitted ultrasonic wave travels in the axial direction of said supporter; and
   a pressure equalizing bore provided in said supporter to provide communication between said chamber and the outside.

2. The apparatus of claim 1, wherein said electrodes are provided with openings and spaced apart from said piezoelectric polymer film, whereby a driving voltage is applied to said electrodes to transmit an ultrasonic wave toward a surface of measurement and an induced charge which is produced on said electrodes is detected on the basis of the electric charge generated on said piezoelectric polymer film by the reflected ultrasonic wave from the surface of measurement.

3. The apparatus of claim 1, further comprising lead wires led out from said electrodes, respectively; and protective films entirely covering said electrodes, said protective films being formed using polymono-, di-, or tri-fluoroethylene, and said protective films being bonded together at their respective peripheral edge portions by means of fusion welding.

4. The apparatus of claim 2, further comprising lead wires led out from said electrodes, respectively; and protective films entirely covering said electrodes, said protective films being formed using polymono-, di-, or tri-fluoroethylene, and said protective films being bonded together at their respective peripheral edge portions by means of fusion welding.

5. The apparatus of claim 1, wherein said piezoelectric polymer film has a vibrating surface which has various curvatures to radiate an ultrasonic wave toward a surface of measurement and to receive the reflected ultrasonic wave therefrom, whereby the distance to the surface of measurement is measured on the basis of the time interval from the radiation of the ultrasonic wave to the reception of the reflected wave.

6. The apparatus of claim 2, wherein said piezoelectric polymer film has a vibrating surface which has various curvatures to radiate an ultrasonice wave toward a surface of measurement and receive the reflected ultrasonic wave therefrom, whereby the distance to the surface of measurement is measured on the basis of the time interval from the radiation of the ultrasonic wave to the reception of the reflected wave.

7. The apparatus of claim 3, wherein said piezoelectric polymer film has a vibrating surface which has various curvatures to radiate an ultrasonic wave toward a surface of measurement and receive the reflected ultrasonic wave therefrom, whereby the distance to the surface of measurement is measured on the basis of the time interval from the radiation of the ultrasonic wave to the reception of the reflected wave.

* * * * *